(12) United States Patent
DeBruin

(10) Patent No.: US 8,225,547 B2
(45) Date of Patent: Jul. 24, 2012

(54) VINE CROP SUPPORTING SYSTEM

(76) Inventor: Arjen DeBruin, Thunder Bay (CA)

( * ) Notice: Subject to any disclaimer, the term of this patent is extended or adjusted under 35 U.S.C. 154(b) by 0 days.

(21) Appl. No.: 12/701,209

(22) Filed: Feb. 5, 2010

(65) Prior Publication Data

US 2010/0229463 A1 Sep. 16, 2010

Related U.S. Application Data

(60) Provisional application No. 61/150,122, filed on Feb. 5, 2009.

(51) Int. Cl.
*A01G 17/04* (2006.01)
(52) U.S. Cl. ............................. 47/46; 47/1.01 S; 47/44
(58) Field of Classification Search ............... 47/1.01 S, 47/42, 43, 44, 45, 47, 83, 46
See application file for complete search history.

(56) References Cited

U.S. PATENT DOCUMENTS

| | | | | |
|---|---|---|---|---|
| 4,254,579 A | | 3/1981 | Flynn | |
| 4,322,911 A | * | 4/1982 | Bach | 47/45 |
| 4,615,140 A | * | 10/1986 | Frano | 47/44 |
| 6,138,407 A | * | 10/2000 | Pierce, Jr. | 47/46 |
| 6,928,772 B2 | * | 8/2005 | Bai et al. | 47/62 R |
| 7,571,567 B2 | * | 8/2009 | Bortolussi | 47/46 |
| 2001/0052593 A1 | * | 12/2001 | Parrish | 254/199 |
| 2005/0072045 A1 | * | 4/2005 | Parrish | 47/46 |
| 2006/0162252 A1 | * | 7/2006 | Lim | 47/59 R |
| 2008/0190019 A1 | * | 8/2008 | Hart | 47/47 |
| 2009/0293353 A1 | * | 12/2009 | Arief et al. | 47/47 |
| 2011/0005634 A1 | * | 1/2011 | Schmitt | 140/113 |

FOREIGN PATENT DOCUMENTS

| | | | | |
|---|---|---|---|---|
| DE | 4216674 A1 | * | 2/1993 | |
| EP | 1703 A1 | * | 5/1979 | |
| GB | 994096 A | * | 6/1965 | |
| GB | 2027323 A | * | 2/1980 | |
| GB | 2035957 A | * | 6/1980 | |

* cited by examiner

*Primary Examiner* — Rob Swiatek
*Assistant Examiner* — Lisa Tsang
(74) *Attorney, Agent, or Firm* — Ryan W. Dupuis; Kyle R. Satlerthwaite; Ade & Company Inc.

(57) ABSTRACT

Vine plants are layered along a row of vine plants supported in growing media in a vine crop by a vine planet supporting system suspended from an overhead building structure locating the vine crop therein. The system includes a track extending in a longitudinal direction along the row of vine plants spaced above the growing media. A spool body supporting a string wound thereon is associated with each vine plant to support the vine plant extending along the string. A carrier body slidable along the track supports each spool body on the track. The spool bodies are coupled to the track such that the spool bodies are each arranged to unwind the string therefrom responsive to displacement of the spool body with the respective carrier body in the direction of the row of vine plants.

15 Claims, 11 Drawing Sheets

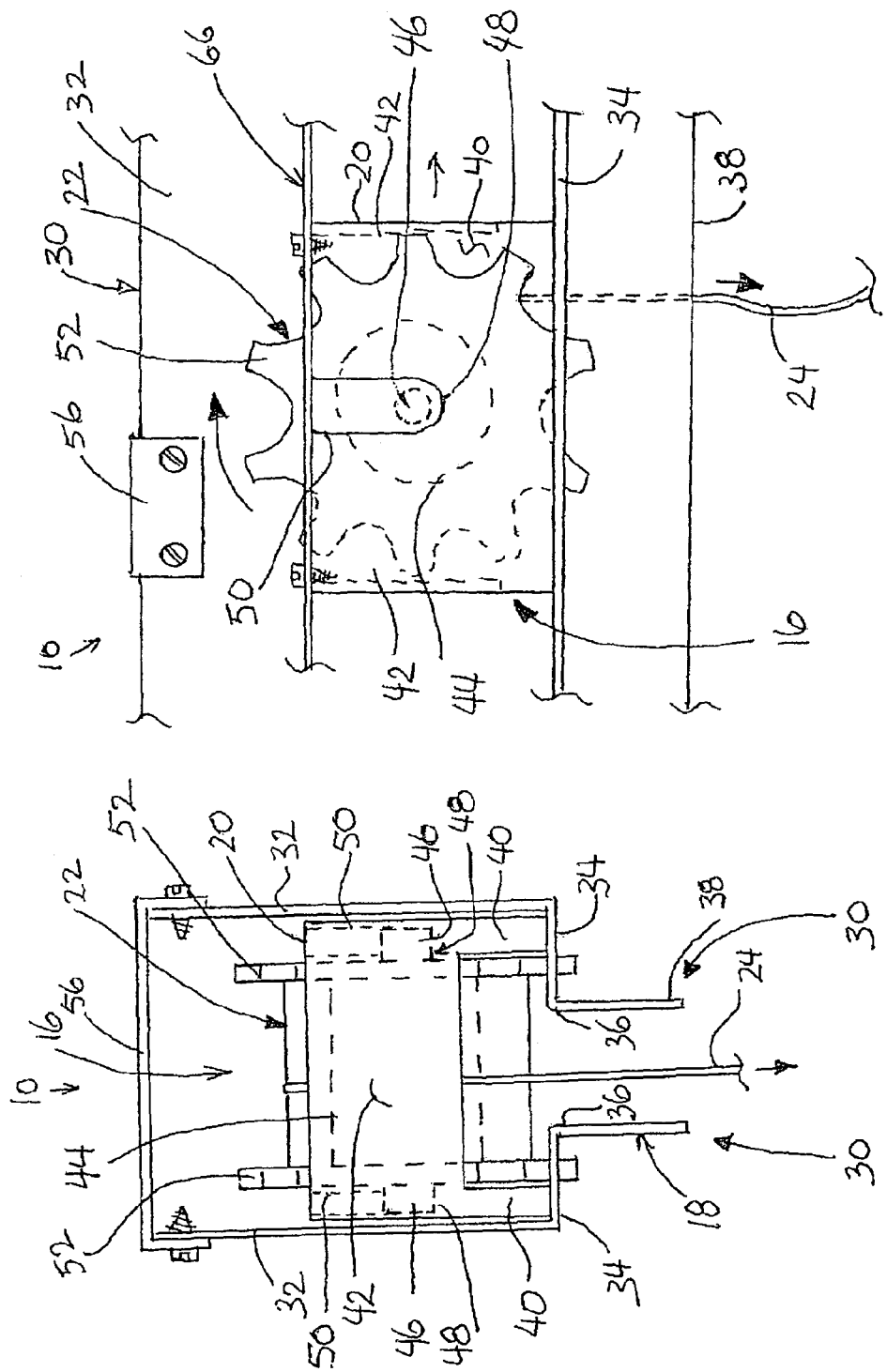

VINE CROP SUPPORTING SYSTEM

This application claims the benefit under 35 U.S.C. 119(e) of U.S. provisional application Ser. No. 61/150,122, filed Feb. 5, 2009.

FIELD OF THE INVENTION

The present invention relates to a system for supporting a vine plant in a vine crop, for example vine tomatoes, such that the vine plant can be readily lowered along a row of vine plants to layer the vine plants along a growing media supporting the plants as the crop grows.

BACKGROUND

Vine plants, for example tomato plants are commonly planted in rows in a greenhouse environment. Strings are typically suspended from spools supported on an overhead structure of the greenhouse such that the vine plants are permitted to grow upwardly along the string upon which they are supported. As the plant grows to the top of the string, the string is unwound from the spool and the spool is displaced horizontally in the direction of the rows of plants so that the vine plants are effectively layered on top of one another along the growing media supporting the plants in the direction of the rows.

U.S. Pat. Nos. 6,928,772 by Eai et al. and 4,254,579 by Flynn disclose examples of devices for supporting and training vine plants, such as tomatoes and the like. In each instance the spools from which the strings are suspended to support the vine plants respectively thereon must be individually and manually unwound as well as manually displaced along the row independently of one another as the vine plants are layered. The process of layering the vine plants is accordingly very labour intensive, consuming considerable time and effort, while also requiring dangerous use of scissor-lift carts that are being moved about frequently through a greenhouse environment.

SUMMARY OF THE INVENTION

According to one aspect of the invention there is provided a vine plant supporting system for laying a vine plant along a row of vine plants supported in growing media in a vine crop, the system comprising:

a track arranged to be supported to extend in a longitudinal direction along the row of vine plants spaced above the growing media;

a spool body supporting a string wound onto the spool body about an axis of the spool body, the string being arranged to support the vine plant such that the vine plant extends along the string; and a carrier body supporting the spool body on the track so as to be arranged for movement along the track in the longitudinal direction of the track;

the spool body being coupled to the track such that the spool body is arranged to unwind the string therefrom responsive to displacement of the spool body in the longitudinal direction along the track.

By providing a spool body which can unwind string therefrom responsive to displacement of the spool body along the longitudinal direction of the track, the desired amount of string is automatically dispensed from the spool body instead of manually judging the appropriate amount of string to be dispensed. Furthermore by moving plural spools together along the track, all of the spools can be unwound simultaneously in an automated manner which saves considerable time and which is much safer than relocating a scissor-lift cart at each vine plant location to manually dispense the string from the spool bodies.

The spool body is preferably coupled to the track such that the spool body is arranged to unwind a length of the string therefrom at a rate which corresponds to a displacement distance along the track as the spool body is displaced in the longitudinal direction along the track.

The spool body is preferably supported for rotation about the axis of the spool body which is oriented to be substantially horizontal and perpendicular to the longitudinal direction of the track.

Preferably the carrier body is supported so as to be arranged for sliding movement along the track and the spool body is supported on the carrier so as to be arranged for rotation about the axis of the spool body relative to the carrier body.

The spool body may comprise a central drum portion upon which the string is wound and a pair of axial portions extending axially outward from opposing ends of the drum portion. The axial portions may be formed integrally with the central drum portion and supported in rotatable contact with respective seating surfaces on the carrier body.

Preferably there is provided a plurality of other spool bodies of like configuration supported by respective carrier bodies so as to be arranged for movement along the track at spaced apart positions in the longitudinal direction of the track. In this instance, there is preferably provided a common controller arranged to commonly displace all of the spool bodies together with one another in the longitudinal direction of the track.

The spool body is preferably coupled to the track so as to be arranged for rolling movement along the track. More particularly, the spool body may include a plurality of gear teeth positioned circumferentially about the axis of the spool body such that the track is arranged for meshing engagement with the gear teeth so as to be arranged to rotate the spool body about the axis of the spool body responsive to displacement of the spool body in the longitudinal direction along the track.

When provided in combination with a vine plant supported on the string, preferably weight of the vine plant urges rotation of the spool body about the axis of the spool body so that the string is unwound from the spool body. When the carrier body is supported so as to be arranged for sliding movement along the track and the spool body is supported on the carrier so as to be arranged for meshing engagement with the track such that rotation of the spool body to unwind the string displaces the carrier body along the track in a first direction, preferably the carrier body is supported on the track such that frictional engagement between the carrier body and the track substantially resists movement of the carrier body in the first direction responsive to unwinding of the string by the weight of the vine plant. In this instance a controller is preferably arranged to urge displacement of the carrier body along the track in the first direction.

When there is provided a plurality of other spool bodies of like configuration supported by respective carrier bodies so as to be arranged for movement along the track at spaced apart positions in the longitudinal direction of the track, the controller is preferably arranged to commonly displace all of the spool bodies together with one another in the first direction along the track.

Preferably the system is used in combination with a building including an overhead supporting structure in which the track is suspended from the overhead supporting structure.

In a preferred embodiment, the carrier body may be arranged to suspend the spool body below the track.

Also in the preferred embodiment, the track may comprise a single channel extending in the longitudinal direction of the track in which the carrier body comprises a portion arranged to be received within a hollow interior of the channel for sliding movement along the track.

When there is provided a plurality of other spool bodies of like configuration supported by respective carrier bodies so as to be arranged for movement along the track at spaced apart positions in the longitudinal direction of the track and a common controller arranged to commonly displace all of the spool bodies together with one another in the longitudinal direction of the track, the controller may comprise an elongate tether extending through the hollow interior of the channel between the carrier bodies.

In the preferred embodiment, the carrier body is coupled to the track for pivotal movement about a generally horizontal pivot axis between a parked position arranged to frictionally resist sliding movement along the track and a released position arranged to be readily slidable along the track. In this instance, the string is preferably arranged to be suspended from the carrier body at a location horizontally offset from the pivot axis of the carrier body such that a vine plant supported on the string urges the carrier body to rotate in a first direction towards the parked position.

The controller coupled to the carrier body is preferably arranged to urge rotation of the carrier body about the pivot axis in a second direction towards the released position and opposite to the first direction.

The controller may comprise an elongate tether extending in the longitudinal direction of the track in which the tether is coupled to the carrier body such that displacing the tether in a forward direction of the carrier body movement along the track to unwind the string from the spool body urges the rotation of the carrier body about the pivot axis in the second direction.

The track may comprise a pair of straight sections supported parallel and spaced apart from one another so as to be arranged to be aligned with parallel and spaced apart rows of vine plants respectively and a curved section joined between the straight sections, the spool body being movable along both of the straight sections and the curved section therebetween.

In other embodiments, the carrier body comprises a lower surface arranged for sliding engagement along the track in which the lower surface comprises a material having a low coefficient of friction.

The track in other embodiments may comprise two track portions receiving the spool body therebetween and the gear teeth comprise two sets of gear teeth positioned circumferentially about axis of the spool body at axially opposed ends of the central drum portion such that each set of gear teeth is arranged for meshing engagement with a respective one of the two track portions. In this instance, the two track portions of the track comprise a pair of straight sections supported parallel and spaced apart from one another so as to be arranged to be aligned with parallel and spaced apart rows of vine plants respectively and a curved section joined between the straight sections, and the spool body is movable along both straight sections and the curved section therebetween, preferably only one of the two track portions at the curved section is arranged for meshing engagement with the respective set of gear teeth of the spool body.

In alternative embodiments, the controller may be arranged to controllably resist displacement of the carrier body along the track in the first direction.

Also in alternative embodiments, when the track comprises two track portions receiving the carrier body therebetween, each track portion may comprise an upright side wall and a ledge extending inwardly towards the other track portion to an inner edge of the ledge. The carrier body in this instance is preferably supported in sliding engagement along opposing sides thereof on the ledges of the two track portions. The inner edges of the ledges of the two track portions are typically spaced apart from one another along a length of the track to receive the string of the spool body suspended therethrough. The upright side walls of the two track portions are typically joined with one another above the carrier body at spaced apart positions in the longitudinal direction of the track.

Various embodiments of the invention will now be described in conjunction with the accompanying drawings in which:

BRIEF DESCRIPTION OF THE DRAWINGS

FIG. 4 is an end elevational view of the track shown supporting a spool body on a carrier body thereon according to the embodiment of FIG. 1.

FIG. 5 is a side elevational view of the carrier body supporting the spool body on the track according to the embodiment of FIG. 1.

In the drawings like characters of reference indicate corresponding parts in the different figures.

DETAILED DESCRIPTION

Figure 1:
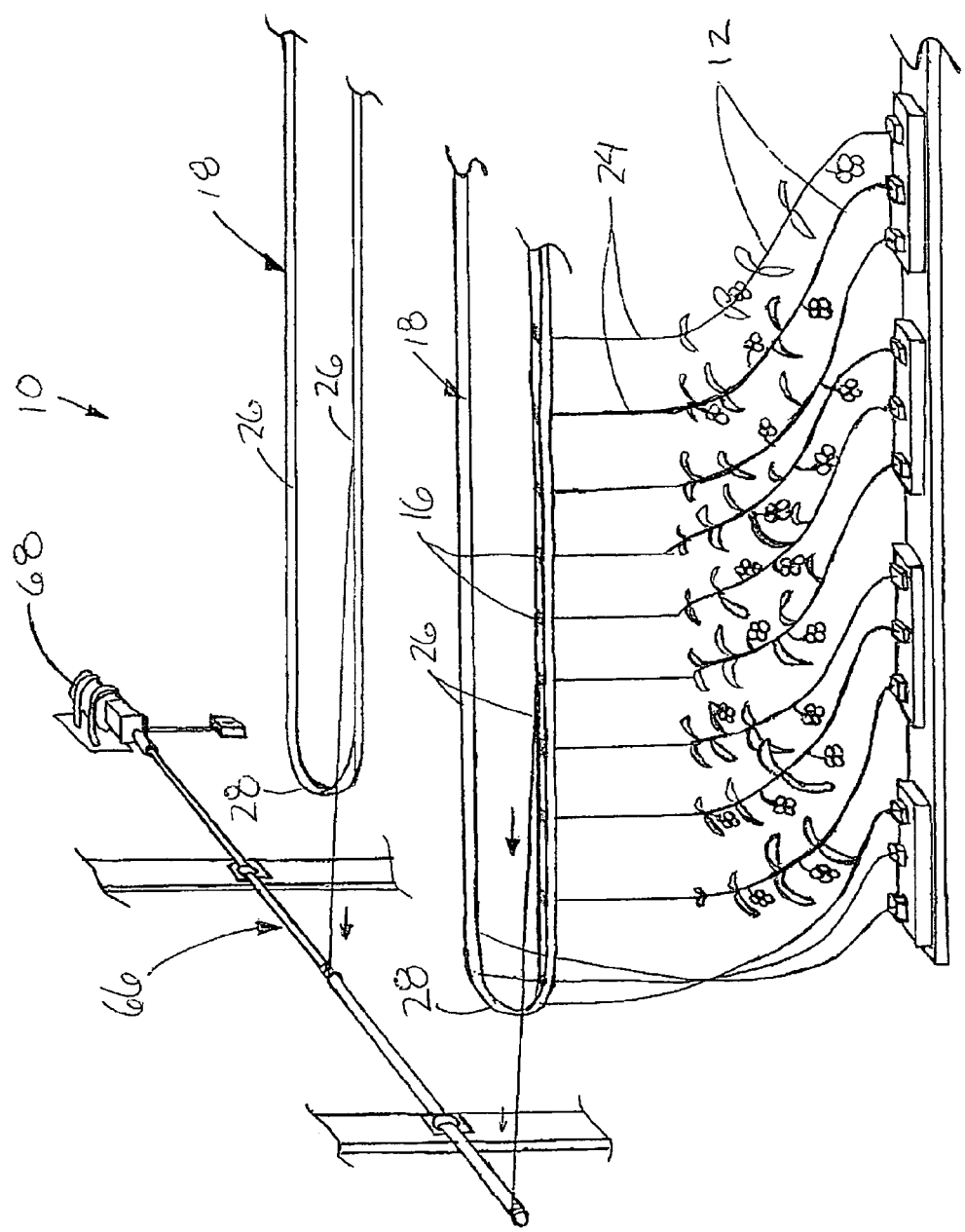
FIG. 1 is a schematic overview of one example of the vine plant supporting system according to the present invention.
Figure 2:
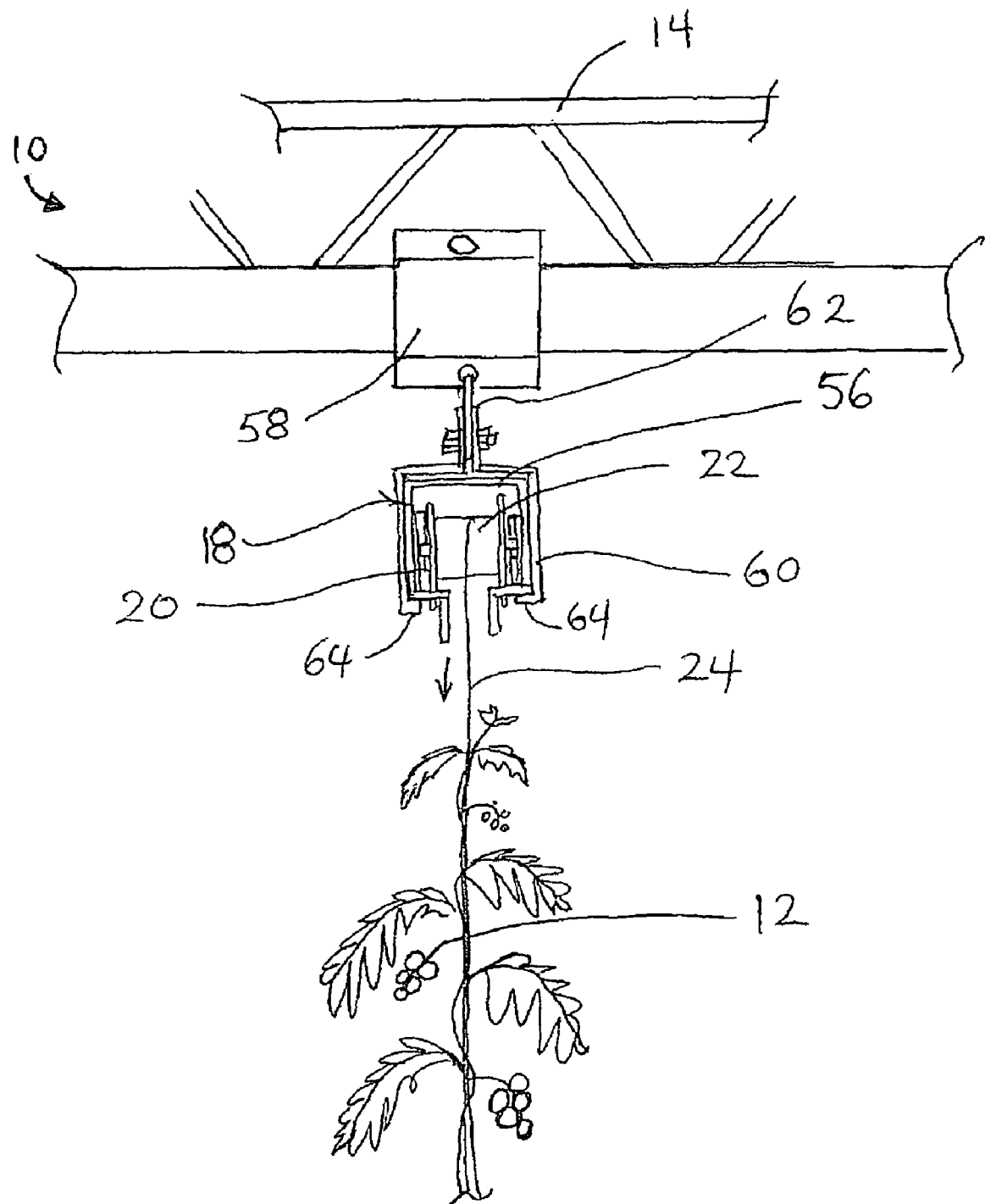
FIG. 2 is an end elevational view of the track shown with a spool body supported thereon according to the embodiment of FIG. 1.
Figure 3:
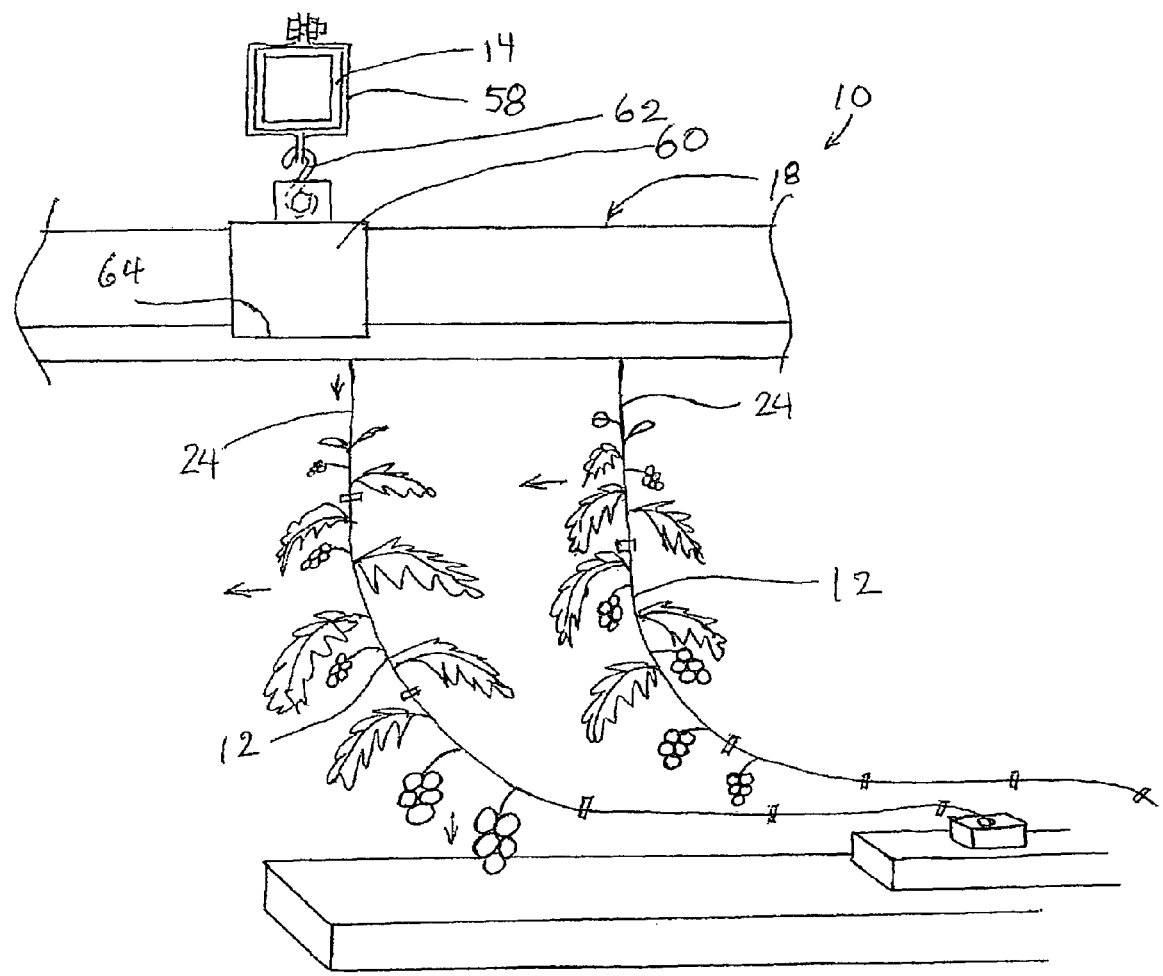
FIG. 3 is a side elevational view of the track shown supporting a plurality of spool bodies thereon according to the embodiment of FIG. 1.

Referring to the accompanying figures there is illustrated a vine plant supporting system generally indicated by reference numeral 10. The system 10 is well-suited for a vine crop, for example vine tomatoes, in which the crop comprises a plurality of vine plants 12 supported in rows in suitable growing media within a building having an overhead supporting structure 14 including a roof supported on trusses for example. The rows of plants are parallel and spaced apart from one another throughout the greenhouse.

Tomatoes are typically harvested from the vine plants adjacent the bottom end thereof close to the growing media while the plant continues to grow at the top end thereof towards the overhead supporting structure. As the vine plants grow upwardly, the strings upon which the vine plants are trained and supported are lowered and displaced laterally in the direction of the respective rows so that a bottom end of each plant is effectively laid along the ground along the row of plants and the top end of the plant is lowered relative to the overhead supporting structure to provide room for the vine plant to continue to grow upwardly along the respective string.

The system 10 according to the present invention comprises a plurality of vine plant supporting devices 16 which are carried on a suitable track 18. Each device 16 generally comprises a carrier body 20 supported for sliding movement along the track in a longitudinal direction of the track and a spool body 22 which is supported on the carrier body 20 for rotation relative to the carrier body about a spool axis which is generally horizontal and perpendicular to the longitudinal direction of the track. A string 24 is wound about the spool axis onto the spool body. As the string 24 is unwound, a respective one of the vine plants is trained to grow along the string such that the string supports the vine plant thereon.

When the spool body 22 is supported rotatably on the carrier body 20 and the carrier body is in turn slidably supported along the track, the spool 22 is arranged to be coupled to track such that the spool is arranged to be rotated about the spool axis to unwind the string therefrom responsive to the sliding movement of the carrier body along the track in the longitudinal direction. The connection between the spool body and the track is arranged such that the string is unwound from the spool body proportionally to the linear distance of displacement of the spool body along the track. Accordingly for each length of string unwound from the spool body, the spool body is displaced in a linear direction along the track in the longitudinal direction thereof by a distance corresponding to said length.

The track 18 comprises a straight section 26 aligned with each of the rows of plants. The straight sections 26 are generally horizontal and parallel to one another spaced above the ground adjacent the overhead supporting structure 14 of the surrounding greenhouse building.

The track also comprises a curved section between each adjacent pair of straight sections at opposing ends thereof in an alternative configuration such that the straight sections 26 and the curved sections 28 coupled therebetween form a continuous path through all of the rows which connects all of the sections of the track.

Each section of track comprises two track portions 30 arranged to receive the plurality of supporting devices 16 therebetween at spaced apart positions in the longitudinal direction of the track. The two track portions 30 comprise two upright side walls 32 of the track which are oriented generally vertical, parallel to one another and spaced apart so as to closely fit the width of the carrier body 20 therebetween.

At the bottom end of each upright side wall 32 there is provided a ledge 34 comprising a horizontal member extending horizontally inward from the bottom end towards the other track portion in which the two ledges 34 are substantially coplanar with one another. The ledges 34 extend inwardly from the respective side walls to respective inner edges 36 which are spaced apart so as to receive the strings unwound from the spool bodies suspended therebetween.

A lower flange 38 depends downwardly from each of the inner edges so that the two lower flanges 38 are parallel and spaced apart from one another in a substantially vertical orientation parallel to the side walls 32. The lower flanges 38 provide added structural support to the two track portions.

In order to form the two track portions 30, each track portion including the side wall 32, ledge 34 and lower flange 38 thereof can be formed of a single plate member which is suitably folded to define the desired shape of the track portion. The track portions are typically formed of sheet metal so that the resulting ledges 34 are generally smooth and horizontal having an upper surface which slidably engages with a lower surface of the carrier body 30 with minimum friction therebetween.

The carrier body 20 comprises an integral block of plastic material which is generally rectangular in shape. The plastic material is selected so as to have a low co-efficient of friction on the lower surfaces of the carrier body which are slidably engaged upon the track.

The carrier body 20 comprises two opposed side walls 40 which are parallel and spaced apart such that the overall width of the carrier body closely fits between the two side walls 32 of the track. The bottom edges of the side walls 40 are arranged to be slidably engaged upon the ledges 34 of the two track portions at opposing sides of the carrier body respectively.

The carrier body also includes two end walls 42 spanning between the side walls 40 perpendicularly thereto at opposing ends of the carrier body to maintain the spacing between the two side walls 40. A hollow interior of the carrier body receives the spool body therein such that the spool body is accessible through an open top end of the carrier body and such that the spool body is arranged to be coupled to the track and the string is arranged to be suspended between the two track portions of the track through the open bottom end of the carrier body.

The spool body 22 comprises a central drum portion 44 which is generally cylindrical in shape about the spool axis. The string is arranged to be wound onto the central drum portion 44 about the spool axis.

The spool body further comprises two axial portions 46 extending axially outward from axially opposed ends of the central drum portion 44. The two axial portions 46 are integrally formed with the central drum portion to define a portion of a shaft at the spool axis at the opposing ends of the central drum portion. The axial portions 46 are arranged to be rotatably supported on respective seating surfaces 48 on the carrier body.

Each of the side walls of the carrier body includes an inner slot 50 in the form of a groove in the inner surface of the side wall which extends vertically from the open top end of the carrier body to the respective seating surface 48 at the bottom end of the slot. The seating surface 48 is generally concave in shape about the spool axis to receive the respective one of the axial portions 46 of the spool body therein. The inner slot 50 provides access of the axial portions into the respective seating surfaces 48 forming the terminal bottom ends of the slots such that the spool body is inserted into the carrier body by vertical sliding configuration through the open top end.

The length of the central drum portion 44 of the spool body in the axial direction closely fits between the inner surfaces of the two side walls of the carrier body with the axial portions extending outward therebeyond into the respective inner slots of the side walls so as to locate the spool body in the axial direction relative to the carrier body. The seating surfaces 48 are spaced upwardly from the bottom end of the carrier body so as to be centrally located within the respective side walls of the carrier body at a location spaced upwardly from the ledge of the track by a distance corresponding approximately to a radius of the spool at respective gear portions 52 at axially opposed ends of the drum portion 44. The seating surfaces of the carrier body and the axial portions 46 of the spool body supported therein are all formed of a smooth plastic material to provide a lower friction rotatable contact between the spool body and the carrier body.

The two gear portions 52 of the spool body each comprise a set of gear teeth extending radially outward from the drum at circumferentially spaced positions about the spool axis. The gear portions 52 define two end walls of the spool body having a greater diameter than the central drum portion 44 of the spool body so that a considerable amount of string can be wound onto the central drum portion of the spool body while remaining less in diameter than the overall diameter of the end walls defined by the gear portions 52. The end walls defined by the gear portions 52 are oriented generally perpendicularly to the spool axis.

A plurality of apertures 54 are provided at longitudinally spaced positions along each of the ledges of the track in which the spacing between the apertures corresponds to the spacing of the teeth of each gear portion 52 of the spool body so that the teeth are arranged for meshing engagement with the apertures in the ledges of the track. Each set of gear teeth is arranged for meshing engagement with a respective set of apertures in a respective one of the two track portions. The gear ratio determined between the teeth of the gear portions and the spacing of the apertures in the track is arranged so that unwinding a length of string from the spool causes the spool to roll along the track to be displaced in the longitudinal direction of the track by the same length.

At the straight sections of the track, both ledges project inwardly sufficiently to be overlapped by the side walls of the carrier body as well as the gear portions at axially opposed ends of the spool body with apertures being provided in both ledges so that both gear portions mesh with the respective ledges of the track.

Although various embodiments of the curved sections are described below, in each instance one ledge of each curved section is arranged so as not to be in meshing engagement with the respective gear portion. Accordingly one of the gear portions is freely rotatable relative to its respective ledge and rotation of the spool body is determined solely by the other one of the gear portions at each curved section.

In order to support the track from the overhead supporting structure of the building, the two track portions of the track are first joined to one another by a plurality of brace members 56 spanning between the top ends of the two opposed side walls of the track at longitudinally spaced positions along the track. The brace members 56 span between the side walls at a height above the carrier bodies and spool bodies so as not to interfere with longitudinal sliding movement of the carrier bodies along the track. Each of the brace members 56 is fastened to the respective side walls of the track by suitable threaded fasteners.

A hanger is provided to suspend the track from the overhead supporting structure including trusses or heating pipes and the like. The hanger generally comprises a clamp bracket 58 arranged to be clamped about a horizontal member of a truss or heating system and the like.

A track bracket 60 is further provided for being secured about the track. The track brackets 60 each comprise a top member spanning between the two side walls of the track at the top end thereof, two side walls extending downwardly along the outer sides of the side walls of the track and two hook flanges 64 at the bottom ends of the sides which extend inwardly below the ledges for retaining the track within the track brackets.

A suitable hook 62 is arranged for suspending each one of a plurality of track brackets at longitudinally spaced positions along the track from respective clamp brackets 58 secured to the overhead supporting structure.

A controller 66 is provided for linking a plurality of the vine plant supporting devices 60 of like configuration, having a spool body and carrier body, at spaced apart positions along the track such that the plurality of devices are moveable together in the linear direction of the track. More particularly, the controller 66 is arranged to commonly displace all of the vine plant supporting devices commonly together in a first direction which corresponds to all of the spool bodies being rotated about the spool axis thereof in an unwinding direction which dispenses string from the spool bodies. Accordingly the strings are all effectively lowered as the spools are displaced horizontally along the rows to permit the vines to be layered along the rows by laying the vine plants along the growing media one on top of each other in the direction of the rows. Due to the coupling of the spool bodies in meshing engagement with the track, unwinding of the string from the spool bodies automatically causes the spool bodies to be responsively displaced in the longitudinal direction of the track in the first direction.

The weight of the vine plants pulling downwardly on the strings upon which they are supported respectively produces a force which urges rotation of the spool bodies in the unwinding direction and which in turn urges linear displacement of the carrier bodies along the track in the first direction. Friction forces between the relative sliding surfaces of the carrier body and the track are arranged such that the friction against the sliding movement in the first direction nearly approximates the force urging the sliding movement in the linear direction by gravity of a fully grown vine plant suspended from the string which urges the rolling movement of the spool along the track in the first direction.

In one exemplary configuration, the friction resisting relative sliding movement in the first direction is less than the force urging the movement in the first direction by gravity of the plants unwinding the strings from the spool bodies so that the controller takes the form of a continuous tether formed of one or more cables to interconnect all of the carrier bodies relative to one another in series along the track by connection to the continuous tether, and a suitable actuator is provided to resist the displacement of the cable and the interconnected carrier bodies in the first direction.

A suitable manual winch or electric motor can be coupled to the actuator for controllably dispensing the cable into the first direction or retracting the cable in an opposing second direction. When friction between the carrier bodies and the track is less than the movement in the first direction that is urged by the weight of the plants, controllably dispensing the cable which interconnects all of the carrier bodies results in simultaneous and controlled lowering of the plants. Using the actuator to controllably unwind and dispense the cable interconnecting the carrier bodies permits the carrier bodies to be controllably and commonly displaced in the first direction while resisting excessive displacement in the first direction by the weight of the plants.

In a further configuration, as shown in FIG. 1, friction between the carrier bodies and the track may be sufficient to overcome the forces of gravity of the plants causing the spool bodies to unwind and displace the carrier bodies resulting in the first direction. In this instance the carrier bodies remain stationary relative to the track until the common cable of the controller 66 which connects all of the carrier bodies is urged in the first direction by the actuator 68 to controllably pull the carrier bodies in the first direction against the force of friction between the carrier bodies and the track which resists the movement in the first direction.

In use, the carrier bodies are initially positioned directly above the respective plants with which they are associated. The string is initially unwound from the spool body to correspond approximately to an overall height between the track and the growing media supporting the bottom of the plants. The vine plants are then trained to grow along respective ones of the strings suspended thereabove. When the vine plants reach the respective spool bodies adjacent the overhead supporting structure of the building, tomatoes are typically harvested from the bottom of the plant and the strings are then lowered to permit continued upward growing of the vines along the string.

The strings are commonly lowered together by commonly displacing all of the carrier bodies of the vine supporting devices in the first direction along the track which causes a corresponding amount of string to be automatically unwound from the spool body by the connection of the spool body to the track. By displacing the carrier bodies in a horizontal direction in the longitudinal direction of the track corresponding to the direction of the rows of the plants, the plants are effectively layered one on top of each other along the rows at the bottom ends thereof. Each time the vines grow up to a height of the spool bodies, the carrier bodies are again all commonly displaced in the first direction along the track by a prescribed length such that the spool bodies responsively dispense a corresponding length of string unwound from the spool bodies.

Figure 6:
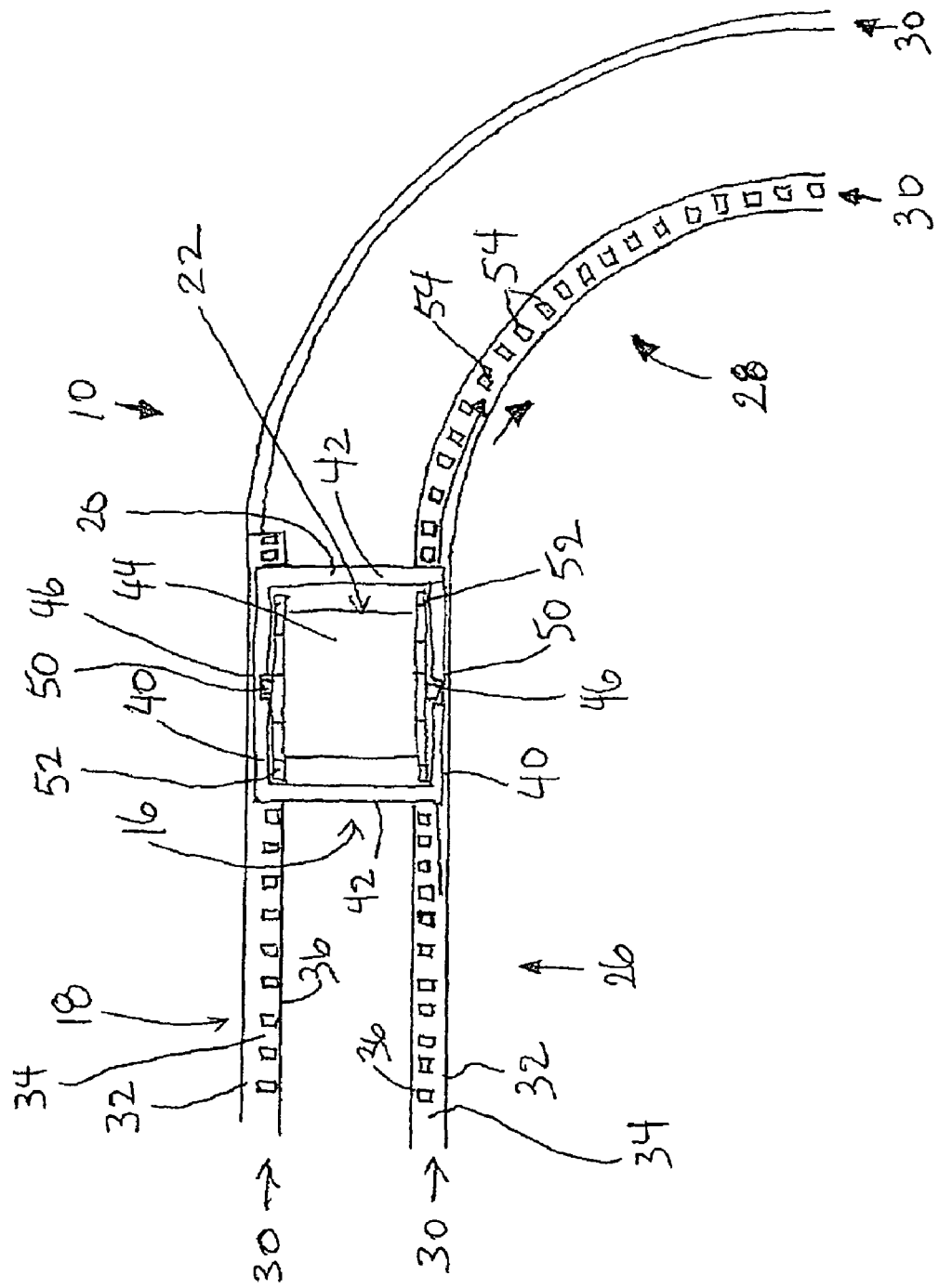
FIG. 6 is a top plan view of one of the vine plant supporting devices including a spool body and carrier body supported on the track according to a first embodiment of the track according to the embodiment of FIG. 1.

As shown more particularly in the embodiment of FIG. 6, at the curved section, an outer one of the ledges is arranged to be much narrower in the horizontal direction so as to project inwardly from the side wall a distance corresponding only to a width of the side wall of the carrier body. Accordingly one of the gear portions is not overlapped by its respective ledge and no apertures are accordingly provided in the ledge as only one of the gear portions is thus arranged for meshing engagement with a respective one of the ledges of the track portions. As further illustrated in FIG. 6, the innermost one of the track portions of each curved section includes apertures therein for meshing engagement with the respective gear portion of the spool body while the other gear portion freely rotates in disengagement with the respective ledge portion.

Figure 7:
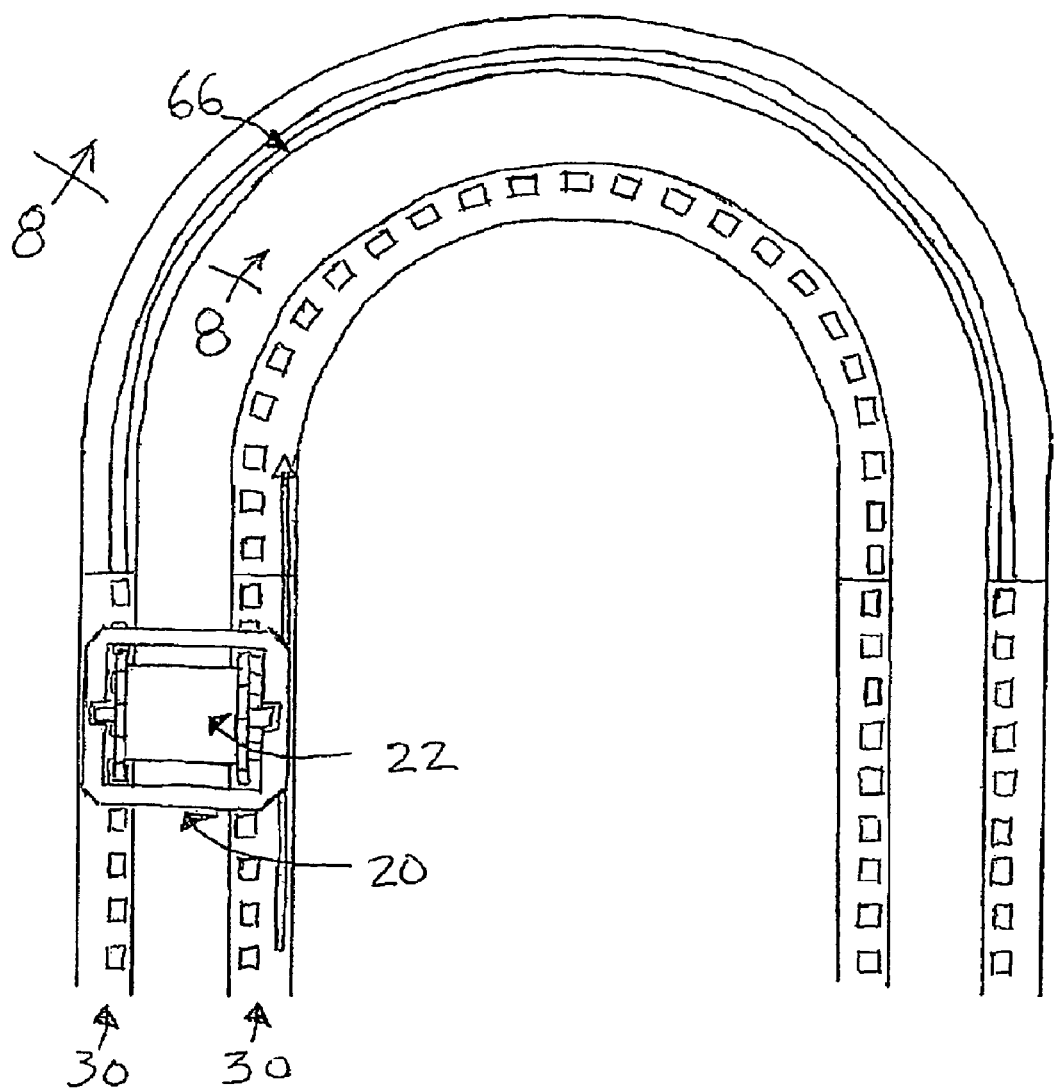
FIG. 7 is a top plan view of one of the vine plant supporting devices including a spool body and carrier body according to the embodiment of FIG. 1 shown supported on a second embodiment of the track.
Figure 8:
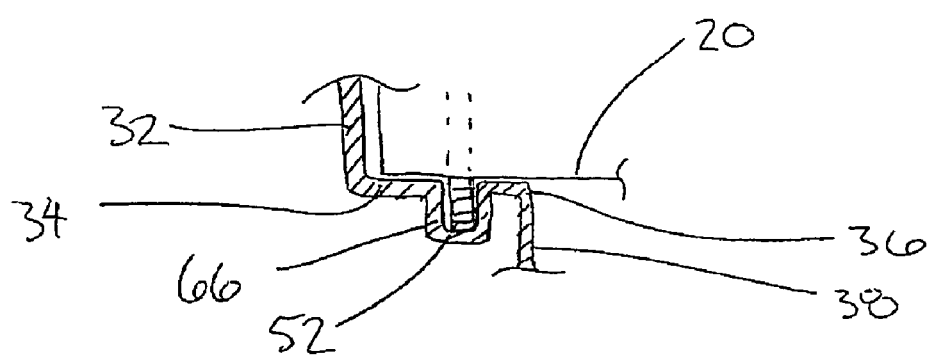
FIG. 8 is a sectional view along the line 8-8 of FIG. 7.

Alternatively as shown in FIGS. 7 and 8, at each curved section, one of the ledges includes a recessed trough portion 66 in alignment with the corresponding row of apertures of the adjacent straight section and in alignment with the respective gear portion 52 of the spool body 22. Depth of the recessed trough portion relative to the horizontal ledge 34 within which it is formed corresponds to the amount that the teeth of the gear portion project downwardly beyond the bottom side of the carrier body in sliding engagement with the ledges. Accordingly, the gear portion received in the trough is arranged to roll on the bottom of the trough portions with the outer free ends of the gear teeth. The overall width of the ledge 34 including the trough portion formed therein corresponds to the width of the ledge 34 of the straight sections and the other curved section so as to provide similar support to the carrier body in sliding engagement thereon.

In further embodiments, the plant supporting devices 16 may be arranged for rolling or sliding movement along any type of track including existing heat pipes or structural members which span horizontally across a greenhouse above rows of vine plants. The spool bodies may also be configured to roll directly along the track. In either instance, the spool bodies are coupled to the track so as to be arranged to unwind string responsive to the horizontal displacement in the longitudinal direction along the track.

Figure 9:
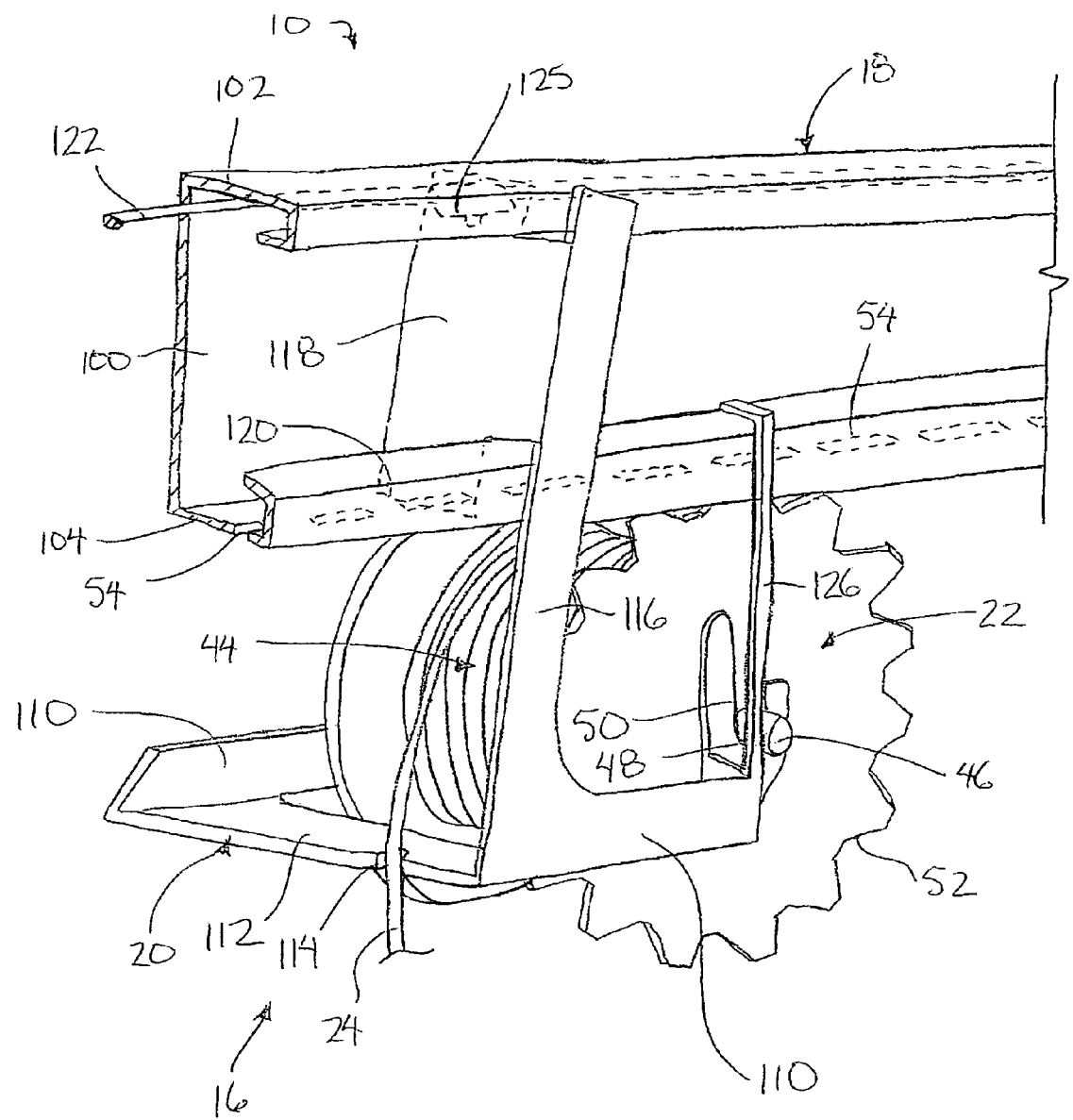
FIG. 9 is a perspective view of a further embodiment of the vine plant supporting system in which the spool and carrier bodies are shown supported on the track.
Figure 10:
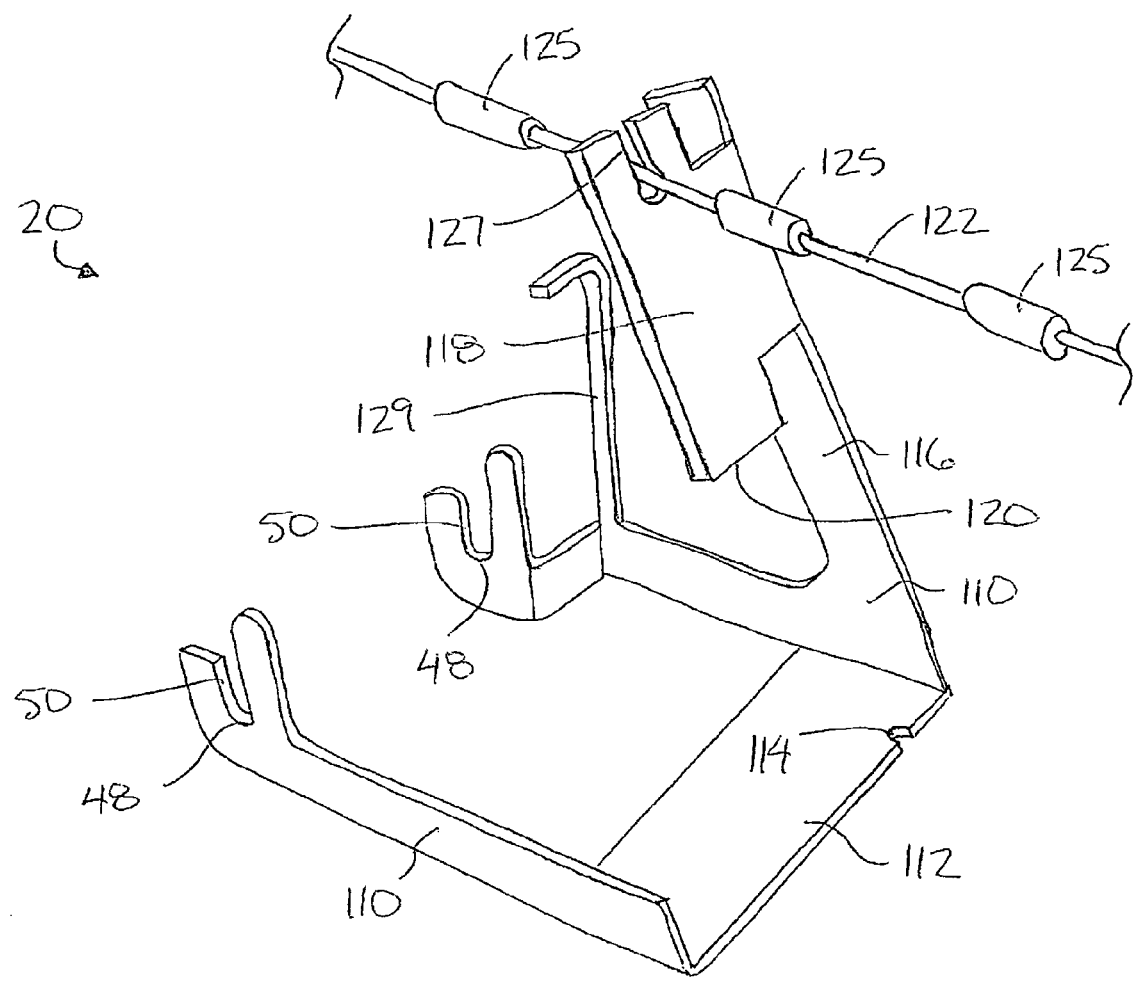
FIG. 10 is a perspective view of the carrier body according to FIG. 9 shown separated from the track and spool body.
Figure 11:
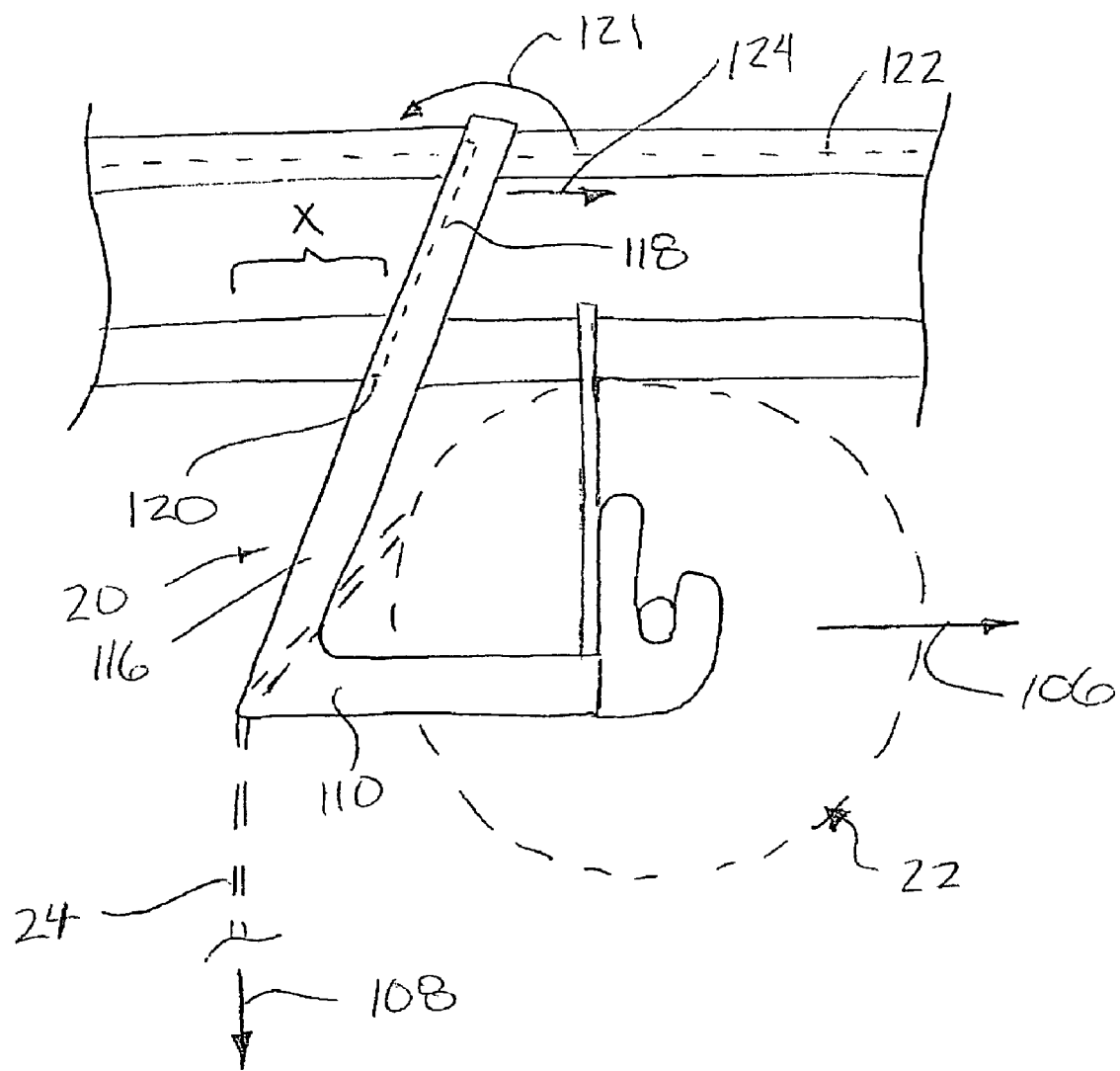
FIG. 11 is a schematic side elevational view of the carrier body of FIG. 9.

Turning now to FIGS. 9 through 11, a further embodiment of the vine plant supporting system 10 is illustrated. In this embodiment, the system again comprises a track 18 extending in a longitudinal direction so as to include a plurality of straight sections 26 extending along rows of vine plants and curved sections 28 extending between adjacent rows of plants at the ends of the straight sections.

Also as described above with regard to the previous embodiment, in the current embodiment the vine plant supporting devices 16 which are supported on the track 18 comprise a carrier body 20 and a spool body 22 about which a string 24 is wound such that the carrier body 20 is slidable along the track and supports the spool body for rolling movement therealong to dispense the string 24 therefrom.

In this preferred embodiment, the track 18 comprises a single channel having an upright wall 100 spanning between a top flange 102 at a top end and a bottom flange 104 at a bottom end. Each of the top and bottom flanges includes a free edge opposite the upright wall 100 which is folded inwardly to form a suitable ledge. The free edges of the flanges, together with the upright wall are generally C-shaped in the cross section of the channel forming the track in which the channel surrounds a hollow interior thereof which is open to one side only between the free edges of the top and bottom flanges. A plurality of apertures 54 are provided at evenly spaced apart positions along the longitudinal direction of the track in the bottom flange 104 to function similarly to the apertures 54 of the previous embodiment to cooperate with the spool body 22.

The spool body 22 is also similar to the previous embodiment in that there is provided a cylindrical drum portion 44 about which the string 24 is wound. End flanges are provided at opposed ends of the drum portion 44 in which one of the end flanges comprises a gear portion 52 similar to the gear portions of the previous embodiments. Two axial portions 46 integrally formed with the drum portion 44 define an axis of rotation of the spool body and are arranged to be supported on the carrier body such that the spool is rotatable about a lateral axis which is horizontal and perpendicular to the longitudinal direction of the track.

The carrier body supports the spool body offset in the lateral direction relative to the track such that the gear portion 52 at one end of the spool body is aligned with the apertures 54 in the bottom flange of the track for meshing engagement of the gear teeth on the gear portion 54 with the apertures and the track. Accordingly as described in the previous embodiment, as the carrier body slides along the track in a forward direction 106, the gear teeth of the gear portion 52 mesh with the apertures in the track such that the spool body rolls along the track in the direction of sliding movement of the carrier body along the track. The spool body is supported such that as the carrier body advances in the forward direction 106 along the track, the string 24 is unwound in the downward direction 108.

The carrier body 20 in the preferred embodiment of FIGS. 9 through 11 comprises a rigid metal plate which is suitably cut and folded into the desired configuration as illustrated. More particularly, the carrier body comprises two opposed side walls 110 which are parallel and spaced apart from one another in the lateral direction so that each side walls extends generally in the longitudinal direction of the track. The side walls extend generally horizontally between respective forward ends locating vertical slots 50 therein and opposing rear ends which are joined together. The slots 50 at the forward ends are open at a top end and define seating surfaces 48 at the bottom end thereof upon which the axial portions 46 of the spool body are arranged to be rotatably supported in use.

The carrier body 20 further comprises a bridge portion 112 spanning between the two side walls so as to be connected between and join the rear ends thereof. The bridge portion is generally horizontal and spaced rearward of the spool body suspended below the track together with the spool body. A notch 114 is formed in a rear edge of the bridge portion 112 adjacent an inner one of the two side walls for alignment with the track thereabove. The string on the spool body is arranged to extend from the spool body overtop of the bridge portion for being suspended from the notch 114 which locates the string in a lateral direction relative to the track while being dispensed from the spool body.

The inner one of the two side walls of the carrier body at the open side of the channel includes an upright connecting portion 116 which is coplanar with the respective side wall and spans upwardly across the open side of the track for connection with a sliding portion 118 of the carrier body 20 which is received in the hollow interior of the track. The sliding portion 118 comprises a plate which is oriented transversely to the longitudinal direction of the track while being substantially parallel to the lateral direction. The plate is mounted in an upright orientation in the channel and has a length which is greater between top and bottom edges of the plate forming the sliding portion than the height of the channel between the top and bottom flanges thereof. Accordingly the plate of the sliding portion 118 is supported at an incline extending upwardly in the forward direction from the bottom end to the top end thereof. The sliding portion 118 is spaced forwardly of the notch at the rear edge of the bridge portion from which the string 24 is suspended. Accordingly the downward force of the weight of the string in the downward direction 108 is offset horizontally rearward from a bottom edge 120 of the sliding portion 118 by a distance X shown in FIG. 11.

The plate forming the sliding portion 118 of the carrier body effectively supports the carrier body such that the bottom edge 120 of the sliding portion engages the bottom flange of the track and supports the sliding portion together with the carrier body substantially for pivotal movement about a lateral pivot axis defined by the bottom end 120. The carrier body 20 is effectively pivotal about the horizontal axis at the bottom edge 120 which is perpendicular to the longitudinal direction of the track between a braking position and a released position. In the braking position, the sliding portion is wedged between the top and bottom flanges of the channel so as to be prevented from sliding along the track. In the released position, the top edge of the sliding portion is pivoted downwardly and forwardly so that the carrier body is readily and freely slidable along the track in the forward direction 106. The rearward offset of the downward force 108 of the string relative to the pivot axis at the bottom edge 120 causes the weight of the vine plant on the string to urge pivotal movement of the carrier body in a first braking direction towards the braking position by urging the plate of the sliding portion into a more vertical orientation.

The controller in this instances comprises an elongate tether 122 which is coupled to the top edge of the plate forming the sliding portion 118. More particularly the tether 122 comprises an elongate flexible cable extending through the hollow interior of the track in the longitudinal direction thereof for connection between a plurality of the vine plant supporting devices 16 at spaced positions along the track. Coupling of the tether 122 to the top end of the plate results in a forward pulling motion 124 in the forward direction 106 applying a moment to the carrier body which urges rotation in an opposing second direction towards the released position. Once the sliding portion is no longer frictionally wedged within the channel, the weight of the vine plant on the string causes the string to automatically unwind from the spool such that the spool rolls along the track in the forward direction thereof to advance the carrier bodies in the forward direction together with the pulling motion 124 of the tether. In this instance the tether 122 of the controller is only required to apply sufficient force to release the sliding portion of the carrier body from the braking position at which point the weight of the vine unrolling the spool provides sufficient force to advance the carrier body along the track.

Connection between the tether 122 and the sliding portion of each carrier body is accomplished by a plurality of lugs 125 which are fixed onto the flexible cable forming the tether at evenly spaced positions therealong, for example at a spacing of approximately one inch between adjacent lugs. Each lug comprises a portion of increased diameter relative to the flexible cable. The upper edge of each sliding portion comprises a vertical slot 127 formed therein having suitable dimensions to slidably receive the flexible cable of the tether downwardly therein while being sufficiently narrow that the lugs 125 are prevented from passing through the slot. The bottom end of each slot terminates nearer to the top end of the plate than the bottom end of the plate for connecting the tether nearer to the top end of the plate forming the sliding portion than the bottom end 120 thereof. The bottom end of each slot may further comprise a portion of enlarged diameter arranged to locate one of the lugs 125 therein such that the lug is prevented from sliding over top of the top edge of the plate forming the sliding portion and instead mates in connection with the bottom end of the slot 127 to remain in fixed relation therewith as the tether is urged in the forward direction in use.

The carrier body further comprises a retainer bar 129 which is formed integrally with the side wall 110 at the inner open side of the channel to extend upwardly from the forward end of the side wall in close proximity to the axis of the spool body. The retainer bar extends upwardly towards a bottom end which is hooked over top of the free edge of the bottom flange. The retainer bar thus serves to maintain a positive engagement of the gear teeth of the gear portion 52 in meshing engagement within the apertures 54 spaced along the bottom flange of the track.

As further shown in the embodiment of FIG. 9, the forward end of the side wall 110 at the inner side of the carrier body 20 which is connected to the connecting portion 116 is arranged to be offset horizontally inward in the direction of the spool body axis relative to the remainder of the side wall and connecting portion. The horizontal offset between the forward end locating the slot 50 therein and the main portion of the side wall 110 which is coplanar with the connecting portion 116 corresponds approximately to half of the width of the track in the lateral direction such that the gear portion 52 at the inner side of the spool body which rotates directly adjacent the forward end of the side wall 110 locating the slot 50 therein is effectively centered in the lateral direction relative to the track for alignment with the respective apertures 54 therein.

Figure 12:
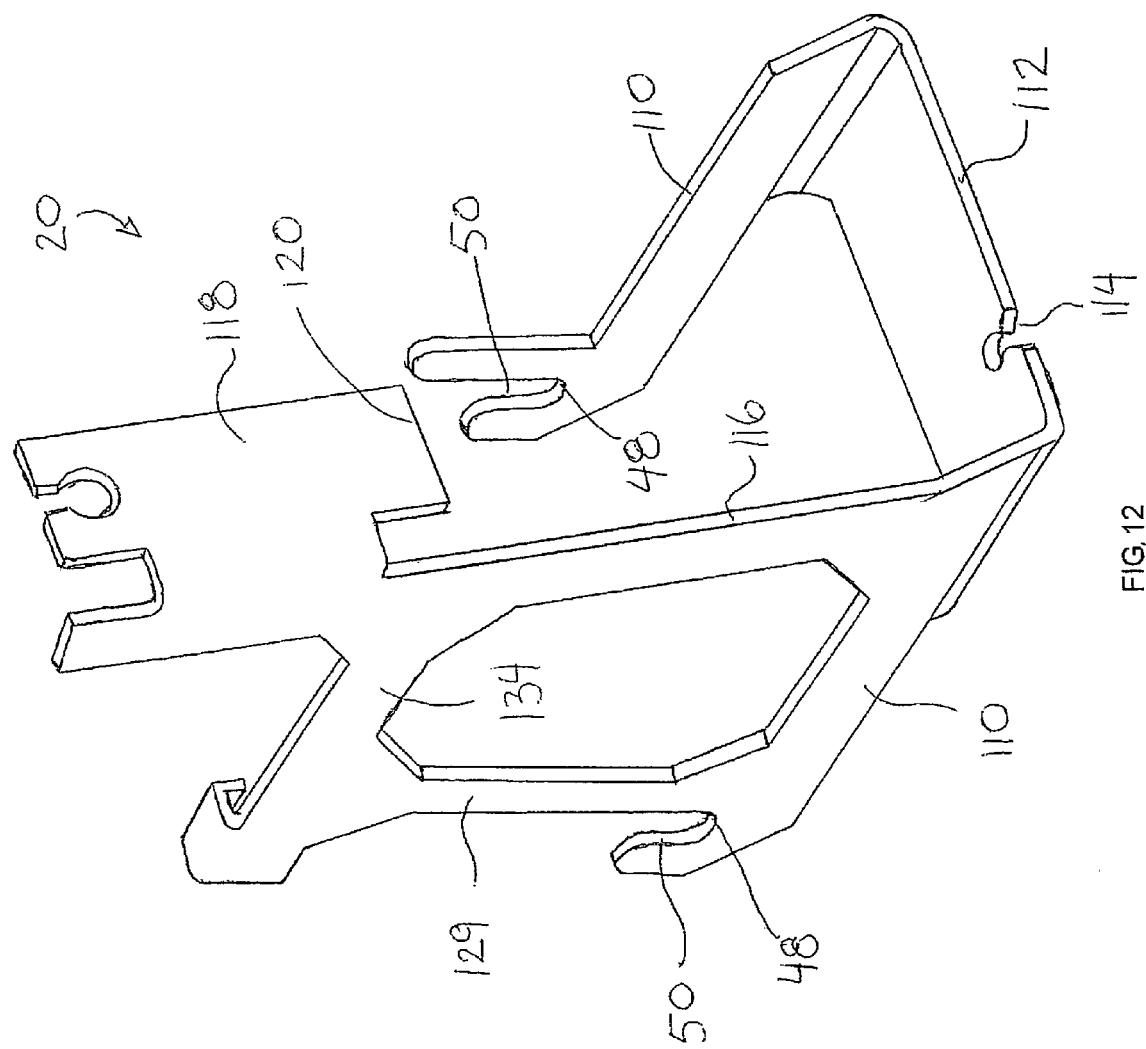
FIG. 12 is a perspective view of a further embodiment of the carrier body for use with a mirror image of the track shown in FIG. 9.
Figure 13:
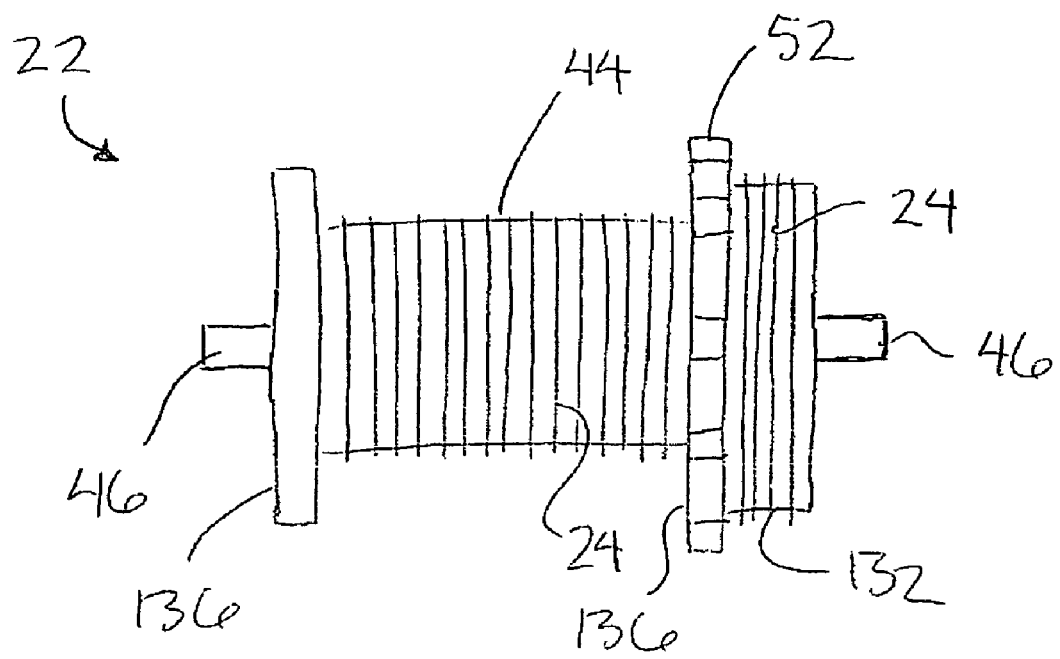
FIG. 13 is a top plan view of a spool body for use with the carrier body of FIG. 12.

Turning now to the embodiment of FIGS. 12 and 13, a further embodiment of the carrier body 20 and the spool body 22 are shown for use with a track which comprises a symmetrical mirror image of the track of FIG. 9. Furthermore the carrier body 20 of FIG. 12 includes an inner side wall 110 at the open side of the track which is coplanar with the connecting portion 116 from rear to forward ends thereof such that the slot 50 receiving the corresponding axial portion 46 of the spool body therein in this instance is also coplanar with the connecting portion 116 spanning the open side of the track.

The carrier body in this instance is further distinguished by the retainer bar 129 which extends upwardly from the forward end of the side wall 110 to a top end which is connected to the connecting portion 116 at a location spaced above the side wall 110 by a connecting arm 134. The connecting arm 134 extends in the longitudinal direction of the side wall 110 at a location spaced thereabove. The top end of the retainer bar 129 again comprises a hook portion which extends inwardly overtop of the lower flange of the track to retain a positive engagement of the gear portion 52 with the apertures 54 in the track.

As shown in FIG. 13, the spool body 22 in this instance includes an offset drum portion 132 at the outer side of the gear portion 52 for spanning the axial distance between the axial portion 46 and the gear portion 52 such that the gear portion remains centered relative to the track when the forward end of the corresponding side wall 110 of the carrier body 20 remains coplanar with the connecting portion 116 spanning the open side of the track.

As described in previous embodiments the spool body 22 comprises a central cylindrical drum 44 about which the string 24 is primarily wound. The drum 44 spans axially between two end flanges 136 spanning radially outward from the drum about the full circumference thereof at the two opposed ends of the drum portion 44. The end flange 136 at the inner end of the spool body defines the gear portion 52 by providing gear teeth about the periphery thereof.

At the outer side of the spool body, the axial portion 46 extends directly from the corresponding end flange 136 as in previous embodiments. At the inner end however, the axial portion 46 is spaced in the axial direction from the corresponding end flange 136 defining the gear portion 52 by the axial space provided by the offset drum portion 132. The offset drum portion 132 also comprises a generally cylindrical drum about which a portion of the string 24 can be wound. The axial distance between the axial portion 46 and the gear portion 52 provided by the offset drum portion 132 corresponds approximately to half of the width of the track in the lateral direction such that the gear portion 52 is again centred in the lateral direction relative to the track when the corresponding axial portion 46 is received within the corresponding slot 50 of the carrier body 20 which is coplanar with the connecting portion 116 at the inner side thereof.

In use the string 24 is initially wound about the main drum portion 44. The end portion of the string, corresponding approximately to the starting length of the string to be suspended from the device 10, is wound about the drum portion 132 prior to initial use. To initiate use, the user first removes the end portion of the string 24 from the offset drum portion 132 such that the starting portion of the string is permitted to be suspended from the track to the starter vine supported on the growing media at the floor of the building structure. Once the initial starting portion of string is suspended from the device 10, the offset drum portion 132 then only provides a proper spacing of the gear portion 52 from the slot 50 in the side wall 110 so that the gear portion is centered relative to the track in the lateral direction.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A vine plant supporting system for use with a row of vine plants supported in growing media in a vine crop, the system comprising:
    a track extending in a longitudinal direction so as to be arranged to be supported along the row of vine plants spaced above the growing media;
    a plurality of vine plant supporting devices supported on the track so as to be spaced apart from one another in series along the track, the vine plant supporting devices being associated with respective vine plants so as to be adapted to suspend the respective vine plants from the track and lay the vine plants along the row of vine plants, each vine plant supporting device comprising:
        a carrier body supported on the track and being linearly movable in the longitudinal direction along the track;
        a spool body rotatably supported on the carrier body so as to be movable together with the carrier body linearly along the track and so as to be rotatable relative to the carrier body; and
        a string wound onto the spool body about an axis of the spool body, the string being adapted to support the vine plant such that the vine plant extends along the string; and
    a tether interconnecting the carrier bodies of the plurality of vine plant supporting devices which are spaced apart from one another in series along the track;
    the tether and the carrier bodies connected thereto being linearly movable together along the track;
    wherein each spool body is coupled to the track such that the spool body is only rotatable about the spool axis relative to the carrier body upon which the spool body is supported responsive to linear displacement of the carrier bodies and the tether longitudinally along the track.

2. The system according to claim 1 wherein the spool body of each vine plant supporting device is coupled to the track such that the spool body is only adapted to unwind a length of the string therefrom at a rate which corresponds to a displacement distance along the track as the spool body is displaced in the longitudinal direction along the track.

3. The system according to claim 1 wherein the spool body of each vine plant supporting device is supported for rotation about the axis of the spool body, the axis of the spool body being oriented to be perpendicular to the longitudinal direction of the track.

4. The system according to claim 1 wherein the spool body of each vine plant supporting device comprises a central drum portion upon which the string is wound and a pair of axial portions extending axially outward from opposing ends of the drum portion, the axial portions being formed integrally with the central drum portion and being supported in rotatable contact with respective seating surfaces on the carrier body.

5. The system according to claim 1 wherein there is provided a common controller arranged to commonly linearly displace all of the carrier bodies together with one another in the longitudinal direction of the track.

6. The system according to claim 1 wherein the spool body of each vine plant supporting device is coupled to the track so as to be arranged for rolling movement along the track.

7. The system according to claim 1 wherein the spool body of each vine plant supporting device includes a plurality of gear teeth positioned circumferentially about the axis of the spool body and wherein the track includes a plurality of apertures longitudinally spaced along the track in meshing engagement with the gear teeth of each vine plant supporting device such that the spool body is rotatable about the axis of the spool body responsive to linear displacement of the carrier body in the longitudinal direction along the track.

8. The system according to claim 1 in combination with a vine plant supported on the string of each vine plant supporting device such that weight of the vine plant urges rotation of the spool body about the axis of the spool body so that the string is unwound from the spool body, wherein the carrier body of each vine plant supporting device is supported so as to be arranged for sliding movement along the track and the spool body is supported on the carrier body so as to be adapted for meshing engagement with the track such that rotation of the spool body to unwind the string displaces the carrier body along the track in a first direction, the carrier body being supported on the track such that frictional engagement between the carrier body and the track substantially resists movement of the carrier body in the first direction responsive to unwinding of the string by the weight of the vine plant.

9. The system according to claim 1 in combination with a building including an overhead supporting structure, the track being suspended from the overhead supporting structure.

10. The system according to claim 1 wherein the carrier body of each vine plant supporting device is arranged to suspend the spool body below the track.

11. The system according to claim 1 wherein the track comprises a single channel extending in the longitudinal direction of the track, the carrier body of each vine plant supporting device comprising a portion arranged to be received within a hollow interior of the channel for sliding movement along the track.

12. The system according to claim 11 wherein said the tether extends through the hollow interior of the channel between the carrier bodies.

13. The system according to claim 12 wherein the carrier body of each vine plant supporting device is coupled to the track for pivotal movement about a generally horizontal pivot axis between a parked position arranged to frictionally resist sliding movement along the track and a released position arranged to be readily slidable along the track, and wherein the string of each vine plant supporting device is arranged to be suspended from the carrier body at a location horizontally offset from the pivot axis of the carrier body such that a vine plant supported on the string urges the carrier body to rotate in a first direction towards the parked position.

14. The system according to claim 13 wherein the tether is adapted to urge rotation of the carrier bodies about the pivot axis in a second direction towards the released position and opposite to the first direction.

15. The system according to claim 1 in combination with a vine plant supported on each string such that weight of the vine plant urges rotation of the spool body about the axis of the spool body so that the string is unwound from the spool body, wherein the carrier body is supported so as to be adapted for linear movement along the track and the spool body is supported on the carrier so as to be arranged for meshing engagement with the track such that rotation of the spool body to unwind the string displaces the carrier body along the track in the forward direction when the tether is urged in the forward direction of the carrier body.

* * * * *